United States Patent [19]

Suzuki et al.

[11] Patent Number: 5,633,862
[45] Date of Patent: May 27, 1997

[54] DTMF SIGNAL TRANSMISSION METHOD IN SINGLE FREQUENCY SIMULTANEOUS TRANSMITTING AND RECEIVING SYSTEM AND SINGLE FREQUENCY SIMULTANEOUS TRANSMITTING AND RECEIVING SYSTEM TRANSCEIVER CAPABLE OF TRANSMITTING DTMF SIGNAL

[75] Inventors: Kenichi Suzuki, Yokohama; Sakari Ohira, Sendai; Fujio Sumi, Tokyo; Osamu Suzuki, Sayama, all of Japan

[73] Assignees: Hitachi Denshi Kabushiki Kaisha, Tokyo; Tohoku Electric Power Co., Inc., Miyagi-ken; Fuji-Tekku Kabushiki Kaisha, Tokyo, all of Japan

[21] Appl. No.: 330,676

[22] Filed: Oct. 28, 1994

[30] Foreign Application Priority Data

Oct. 29, 1993 [JP] Japan ................................. 5-292549

[51] Int. Cl.⁶ ............................................. H04B 1/56
[52] U.S. Cl. ............... 370/280; 370/521; 455/72; 455/84; 379/63
[58] Field of Search .......................... 375/219, 222; 455/38.5, 72, 84; 370/29, 109; 379/58, 63, 361

[56] References Cited

U.S. PATENT DOCUMENTS

| | | | |
|---|---|---|---|
| 4,034,295 | 7/1977 | Kotezawa et al. | 455/72 |
| 5,103,448 | 4/1992 | Barnes et al. | 370/29 |
| 5,117,423 | 5/1992 | Shepherd et al. | 370/29 |
| 5,404,579 | 4/1995 | Obayashi et al. | 455/89 |
| 5,428,601 | 6/1995 | Owen | 370/29 |

*Primary Examiner*—Benedict V. Safourek
*Attorney, Agent, or Firm*—Antonelli, Terry, Stout & Kraus, LLP

[57] ABSTRACT

In radio communication system in which single frequency simultaneous transmission and reception is performed, a speech audio signal is divided by a predetermined time interval. A transmission time and a reception time are allotted in the predetermined time. A time-compressed signal is transmitted during the transmission time, and a time-compressed signal transmitted from other transceiver is received during the reception time and it is decompressed to the original length. The transmission time and the reception time are alternately repeated to transmit and receive the audio signals substantially simultaneously by a single frequency, and the audio signal is reproduced from the received signal. When communication with a telephone set is to be established, a DTMF signal is used as a dialing signal to call the telephone set from the transceiver. The DTMF signal is time-compressed and then transmitted along with the speech signal. A transmission timing of the DTMF signal is controlled, and the generated DTMF signal is temporarily stored in a memory. When the transmission of the DTMF signal can be completed before the transmission time is switched to the reception time is determined, and if it can, the DTMF signal is read from the memory and transmitted.

9 Claims, 10 Drawing Sheets

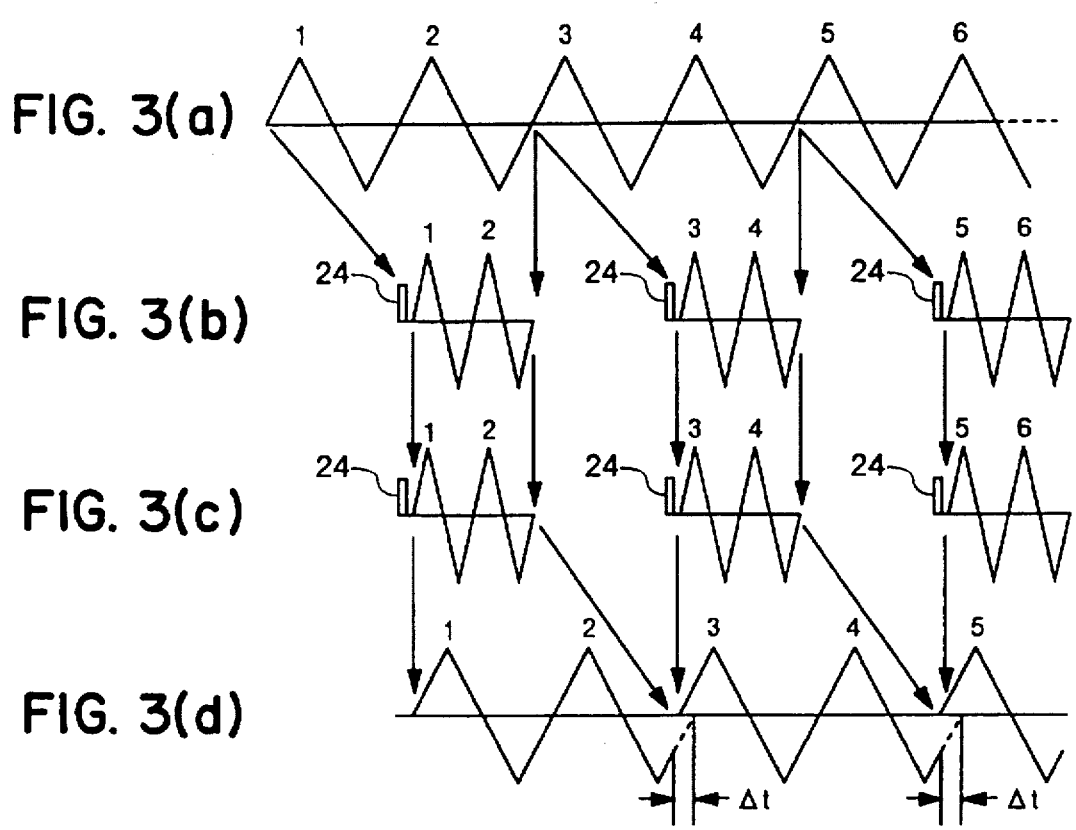

| C4 | C3 | C2 | C1 | R4 | R3 | R2 | R1 |
|----|----|----|----|----|----|----|----|
| 1  | 0  | 1  | 1  | 1  | 1  | 0  | 1  |

| ADDRESS | C4 | C3 | C2 | C1 | R4 | R3 | R2 | R1 |    |
|---------|----|----|----|----|----|----|----|----|----|
| 0       | 1  | 1  | 1  | 0  | 0  | 1  | 1  | 1  | =* |
| 1       | 1  | 1  | 1  | 0  | 1  | 1  | 0  | 1  | =4 |
| 2       | 1  | 1  | 0  | 1  | 1  | 1  | 1  | 0  | =2 |
| 3       | 1  | 0  | 1  | 1  | 1  | 1  | 1  | 0  | =3 |
| 4       | 1  | 0  | 1  | 1  | 0  | 1  | 1  | 1  | =# |
| 5       | 1  | 1  | 1  | 1  | 1  | 1  | 1  | 1  |    |
| 6       | 1  | 1  | 1  | 1  | 1  | 1  | 1  | 1  |    |
| 7       | 1  | 1  | 1  | 1  | 1  | 1  | 1  | 1  |    |

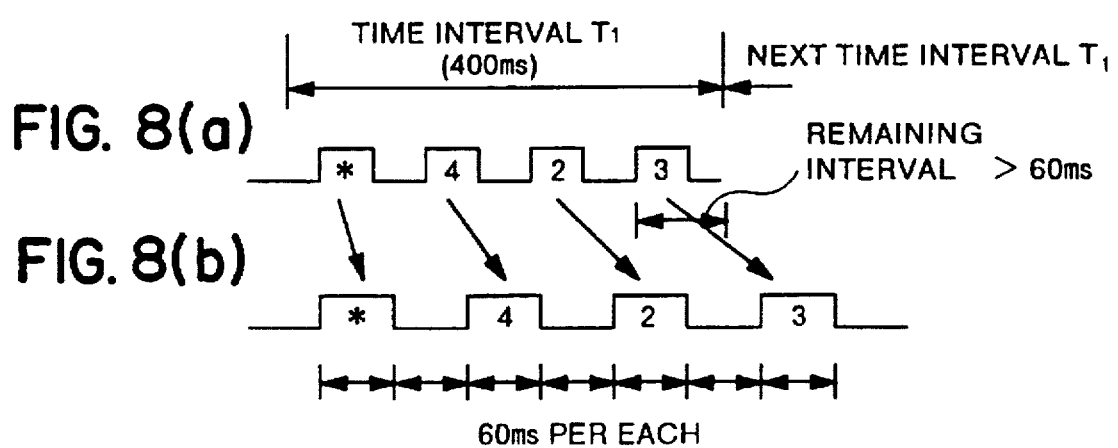

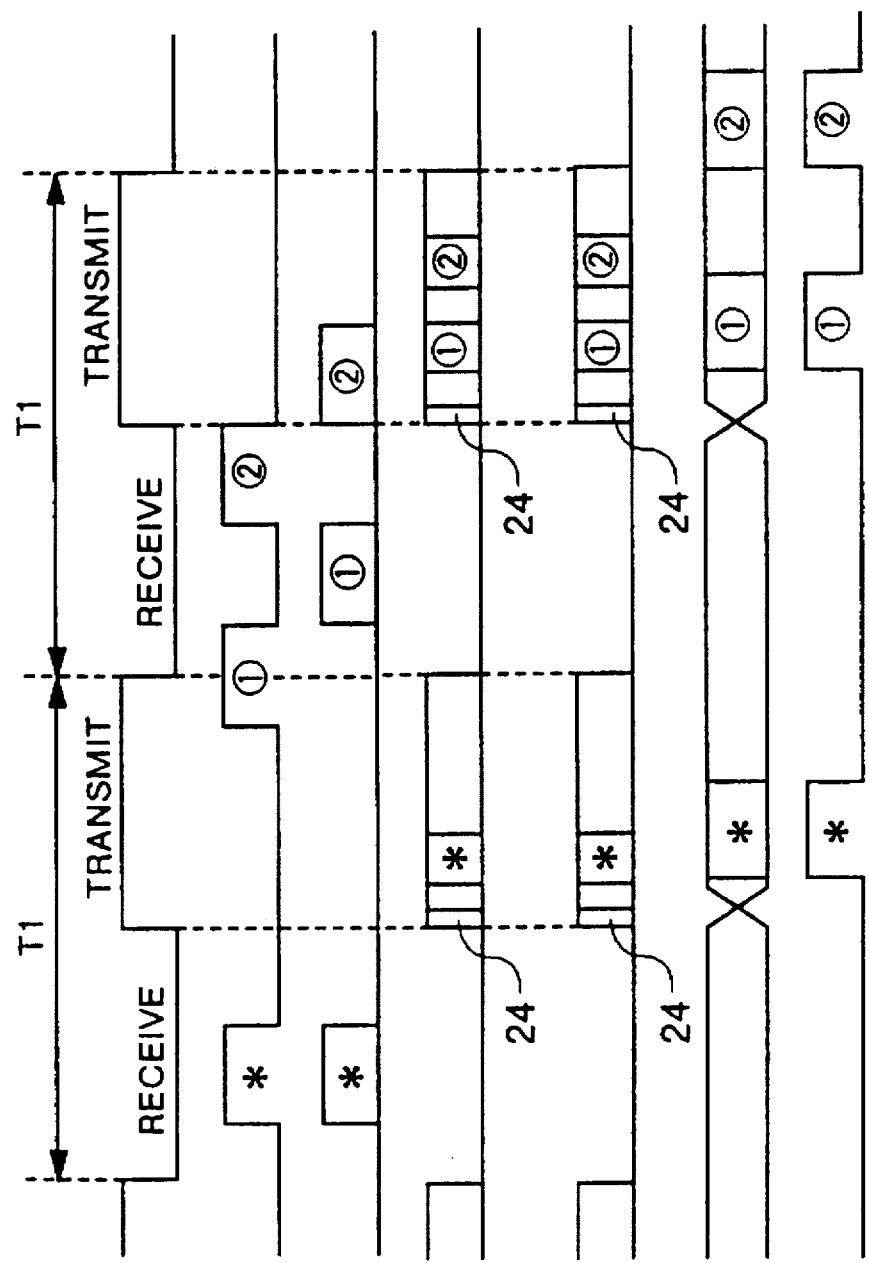

DTMF SIGNAL TRANSMISSION METHOD IN SINGLE FREQUENCY SIMULTANEOUS TRANSMITTING AND RECEIVING SYSTEM AND SINGLE FREQUENCY SIMULTANEOUS TRANSMITTING AND RECEIVING SYSTEM TRANSCEIVER CAPABLE OF TRANSMITTING DTMF SIGNAL

CROSS-REFERENCES TO RELATED APPLICATIONS

The present invention relates to subject matters described in prior applications, Ser. No. 08/027,479 filed on Mar. 8, 1993 issued as U.S. Pat. No. 5,355,363 on Oct. 11, 1994, Ser. No. 08/202,217 filed on Feb. 25, 1994 issued as U.S. Pat. No. 5,493,698 on Feb. 20, 1996, Ser. No. 08/223,976 filed on Apr. 6, 1994 and Ser. No. 08/226,830 filed on Apr. 13, 1994 issued as U.S. Pat. No. 5,524,274 on Jun. 4, 1996. The disclosures of these applications are incorporated herein by reference.

FIELD OF THE INVENTION

The present invention relates to radio communication method and radio communication apparatus which allow simultaneous transmission and reception on essentially real time basis by using a single frequency.

BACKGROUND OF THE INVENTION

There is an instance where communication is established between a transceiver and a telephone of a stationary station or a moving station. As a communication system between a telephone and a mobile transceiver, a system shown in FIG. 11 is available. A transmitted electromagnetic wave from a mobile station transceiver 100 is received by a base station transceiver 200. A line connector 300 interconnects an exchange terminal 400 and a telephone line network including telephone sets 500 connected to the exchange terminal 400. The signal received by the base station transceiver 200 is sent to the telephone set 500 through the line connector 300 and the exchange terminal 400. A signal from the telephone set 500 to the mobile transceiver 100 is sent through a reverse path. The telephone set 500 is either a stationary station or a moving station.

In a conventional radio communication system, the simultaneous transmission and reception at a single frequency is not permitted because of interference of the transmitted signal and the received signal. Two frequencies are usually required in order to realize the simultaneous transmission and reception in the radio communications.

A radio communication system which allows the simultaneous transmission and reception on essentially real time basis by using a single frequency is disclosed in the specification of the PCT application International Publication No. WO 91/02414 (International Publication Date Feb. 21, 1991).

A mobile transceiver of a single frequency simultaneous transmission and reception system has been proposed in "Simultaneous Transmitting and Receiving Method Mobile Radio Using A Single Frequency" Proceedings of 1992 IEICE Spring Conference, Paper No. B-769, page 3-336, Mar. 15, 1992.

SUMMARY OF THE INVENTION

In the single frequency simultaneous transmission and reception radio system of the present invention, the frequency band may be effectively utilized and bi-directional communication on a real time basis is permitted. Thus, the same utilization method as that of a telephone communication system may be attained in the radio communication system of the present invention. Each telephone set is assigned its own telephone number. By dialing the telephone number of a destination station, one can call the telephone set at that station for communication. Where communication is to be made between the telephone set and a transceiver, a dialing function is provided to the transceiver. After a line between the telephone set and the transceiver is established by sending the telephone number, speech communication is started.

The present invention allows communication between a mobile transceiver and a telephone set to occur using the single frequency simultaneous transmission and reception system of the present invention within a mobile radio communication system. A DTMF (Dual Tone Multi-Frequency) signal system is used for dialing from the transceiver to the telephone set. The DTMF signal is a dialing signal which includes a combination of two analog signals of different audio frequencies.

In the present invention, the DTMF signal is transmitted from the transceiver along with the audio signal (speech information). In the present invention, the transceiver may utilize the single frequency simultaneous transmission and reception system disclosed in the co-pending prior applications Ser. No. 08/027,479 filed Mar. 8, 1993 (U.S. Pat. No. 5,355,363), Ser. No. 08/202,217 filed Feb. 25, 1994, Ser. No. 08/223,976 filed Apr. 6, 1994 and Ser. No. 08/226,830 filed Apr. 13, 1994.

When communicating in the single frequency simultaneous transmission and reception system of the present invention, the speech audio signal is divided by a certain time interval (for example, approximately 400 ms) and the signal in each divided interval is compressed to less than half. A synchronization signal is added to the compressed audio signal and they are transmitted. The received compressed audio signal is decompressed and respective intervals are connected together to reproduce the original audio signal. Since the transmission time is compressed to less than half of the original signal, the remaining time interval may be used as a reception time. Since transmission and reception are alternately conducted in the compressed time periods, transmission and reception are conducted essentially simultaneously.

It is a primary object of the present invention to provide a transmission system of the DTMF signal in a single frequency simultaneous transmission and reception radio communication system, and a single frequency simultaneous transmission and reception transceiver which allows for the transmission of the DTMF signal. In order to achieve the above object, the transceiver of the present invention operates as follows.

A continuous audio signal is divided by a predetermined time interval. Each audio signal of the divided interval is time-compressed to less than half an interval. A transmission time and a reception time are allotted in each predetermined time interval. The time-compressed signal is transmitted during the transmission time and a time-compressed signal transmitted from the other transceiver is received during the reception time, and the received time-compressed signal is de-compressed. The transmission time and the reception time are alternately repeated so that the audio signals are essentially simultaneously transmitted and received by a single frequency and the audio signal is reproduced from the received signal. When communication with a telephone is required, a DTMF signal is generated as a dialing signal to call the telephone from the transceiver. The DTMF signal is time-compressed and transmitted.

It is another object of the present invention to provide single frequency simultaneous transmission and reception radio communication system and transceiver which can exactly receive the DTMF signal. In order to achieve the above object, the transceiver of the present invention controls the transmission timing of the DTMF signal. The generated DTMF signal is temporarily stored in a memory. It is determined whether the transmission of the DTMF signal can be completed before the transmission time is switched to the reception time, and if it is, the DTMF signal is read from the memory and transmitted.

The telephone set used in the system of the present invention may be a stationary station telephone or a mobile telephone set.

BRIEF DESCRIPTION OF THE DRAWINGS

FIG. 3 shows waveforms for illustrating discontinuity of phase in the transceiver of FIG. 1, FIG. 8 shows waveforms illustrating a relationship between an output of the keyboard and an output of a DTMF encoder, FIG. 9 shows waveforms for illustrating an operation of the transceiver of FIG. 4.

DESCRIPTION OF THE PREFERRED EMBODIMENTS

Referring to the accompanying drawings, embodiments of the radio communication system and transceiver of the present invention will be explained in detail.

Figure 11:
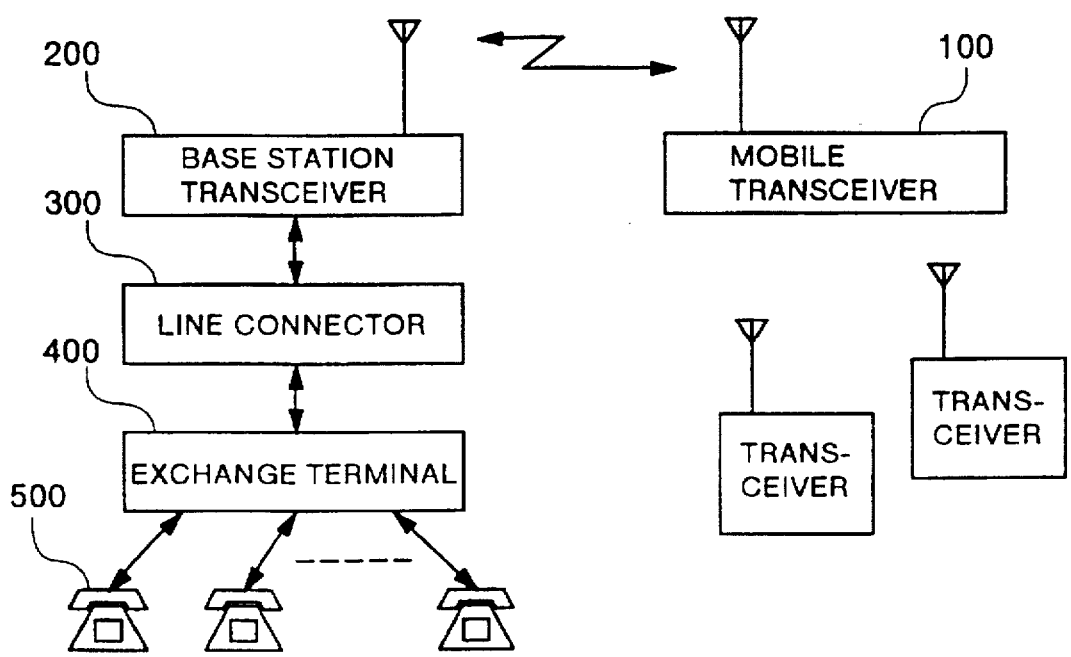
FIG. 11 shows a block diagram of a communication system between a mobile transceiver and a telephone set.

First, referring again to FIG. 11, a transmission method between a transceiver and a telephone set in accordance with the present invention is explained.

First, a mobile transceiver 100 of the present invention is set to a simultaneous transmission and reception mode. The mobile transceiver 100 is equipped with a keyboard for dialing a telephone number of the telephone set. An arrangement of the keyboard will be described later. When an operator of the mobile station depresses keys to enter a telephone number, a DTMF signal corresponding to the key input is generated and the DTMF signal is transmitted from the mobile radio station 100. A base transceiver 200 decodes the received DTMF signal into a digital signal form. In response to the decoded DTMF signal, a line connector 300 hooks off to an exchange terminal 400 to dial to a telephone set 500 (dialing pulses or DTMF). Simultaneously therewith, the base station transceiver 200 is set to the simultaneous transmission and reception mode so that the communication between the telephone set 500 and the mobile transceiver 100 is established.

When the mobile transceiver 100 is to be called from the telephone set 500, the number of the base station transceiver 200 connected to the line connector 300 is dialed from the telephone set 500. The line connector 300 detects a ringer from the exchange terminal 400 and hooks off. At the same time, the base station transceiver 200 is set to the simultaneous transmission and reception mode. When a ring-back tone is stopped by the off-hook, a requested mobile station is called by speech from the telephone set 500. An operator of the called mobile station transceiver 100 turns on a speech switch and sets the simultaneous transmission and reception mode so that the communication between the telephone set 500 and the mobile transceiver 100 is established.

Configuration and operation of an embodiment of the transceiver for transmitting the DTMF signal in accordance with the present invention are now explained.

Figure 1:
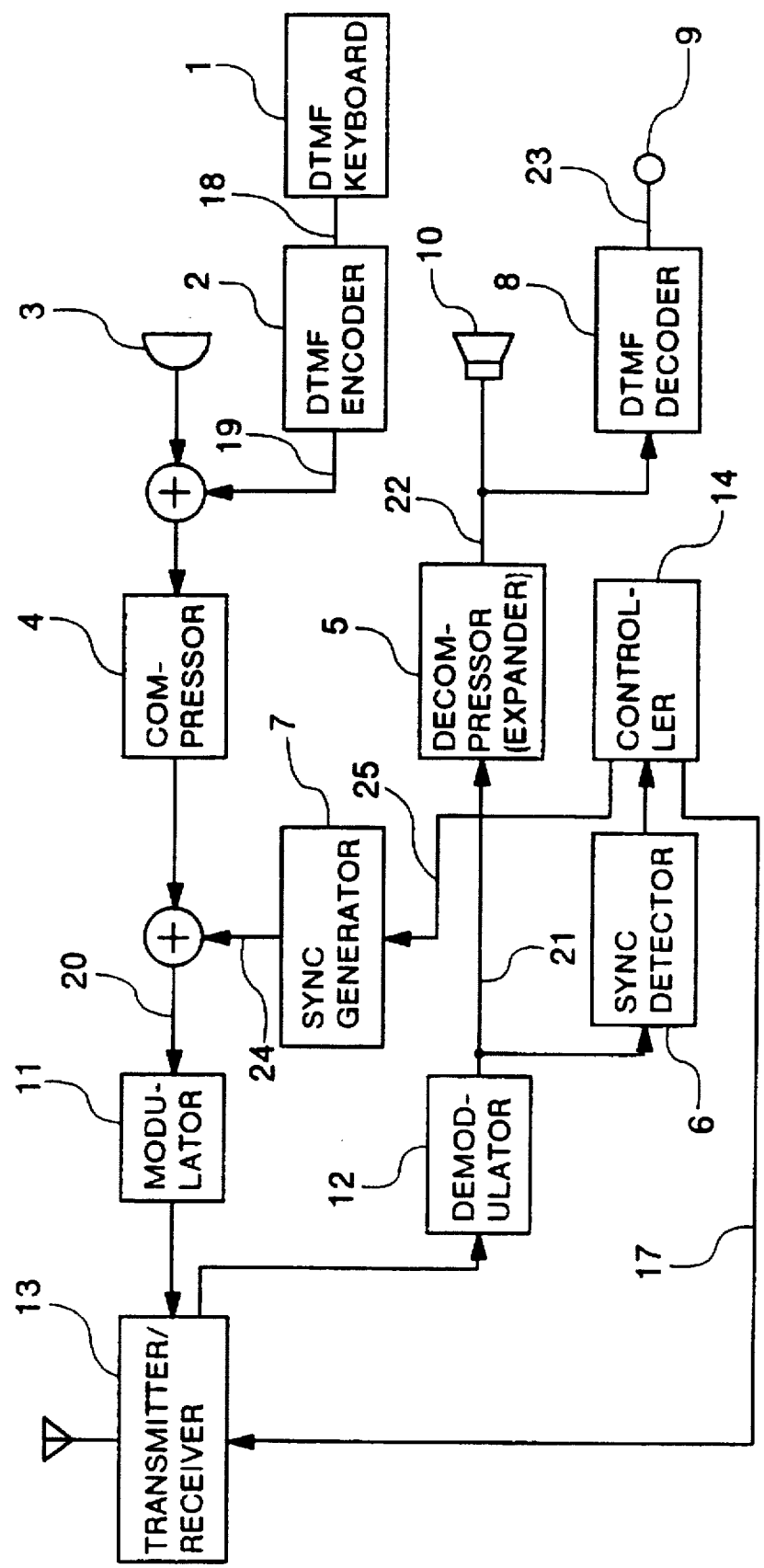
FIG. 1 shows a block diagram of a configuration of a first embodiment of a transceiver of the present invention.

FIG. 1 shows a block diagram of an embodiment of the transceiver of the present invention for transmitting the DTMF signal along with the audio signal (speech signal). Keys or push-buttons of the DTMF keyboard 1 are depressed to enter a telephone number of a destination station. When the telephone number is entered, the DTMF keyboard 1 generates a digital signal 18 corresponding to the key entry. A DTMF encoder 2 converts the digital signal 18 to a DTMF signal 19, including a combination of two high and low audio frequencies. A speech signal (audio signal) from a microphone 3 is time-compressed by a compressor 4. When the DTMF signal is outputted from the encoder 2, the speech signal from the microphone 3 is blocked and prevented from being transmitted.

The DTMF signal and the speech signal are divided by a predetermined time interval (for example, approximately 400 ms), and the signal in each divided interval is compressed to less than half. A synchronization signal 24 is added to the compressed signal. A synchronization signal generator 7 generates the synchronization signal based on a timing signal 25 generated by a controller 14.

A modulator 11 modulates a carrier with the compressed DTMF signal and speech signal. The modulated signal is transmitted from a transmitter/receiver 13.

On the other hand, a signal transmitted from other transceiver and received by the transmitter/receiver 13 is demodulated (detected) by a demodulator 12. Since the demodulated signal is time-compressed, it is decompressed by a decompressor 5. Of the decompressed received signal 22, the DTMF signal is converted to a corresponding digital signal by a DTMF decoder 8 and outputted to an output terminal 9.

Of the decompressed received signal 22, the speech signal is outputted from a speaker 10 in audio sound.

In the other transceiver, which receives the synchronization signal, the synchronization detector 6 detects the synchronization signal from the demodulated signal 21 and applies it to the controller 14. The controller 14 generates a timing signal 17 based on the synchronization signal. The transmission time and the reception time for the transmitter/receiver 13 are switched based on the timing signal 17.

The time compression, the transmission and reception, the demodulation and the decompression in the compressor 4, the modulator 11, the transmitter/receiver 13, the synchronization signal generator 12 and the controller 14 may be conducted in the manners described in the co-pending prior applications Ser. No. 08/027,479, Ser. No. 08/202,217, Ser. No. 08/223,976 and Ser. No. 226,830.

FIG. 2 shows waveforms of an operation when the DTMF signal is transmitted by the transceiver of FIG. 1. The signals shown therein correspond to the elements of the identical numerals in FIG. 1. In the present example, the DTMF signal is transmitted from the transceiver which transmits the synchronization signal (hereinafter referred to as "a calling station").

Figures 2A, 2B, 2C, 2D, 2E, 2F, 2G:
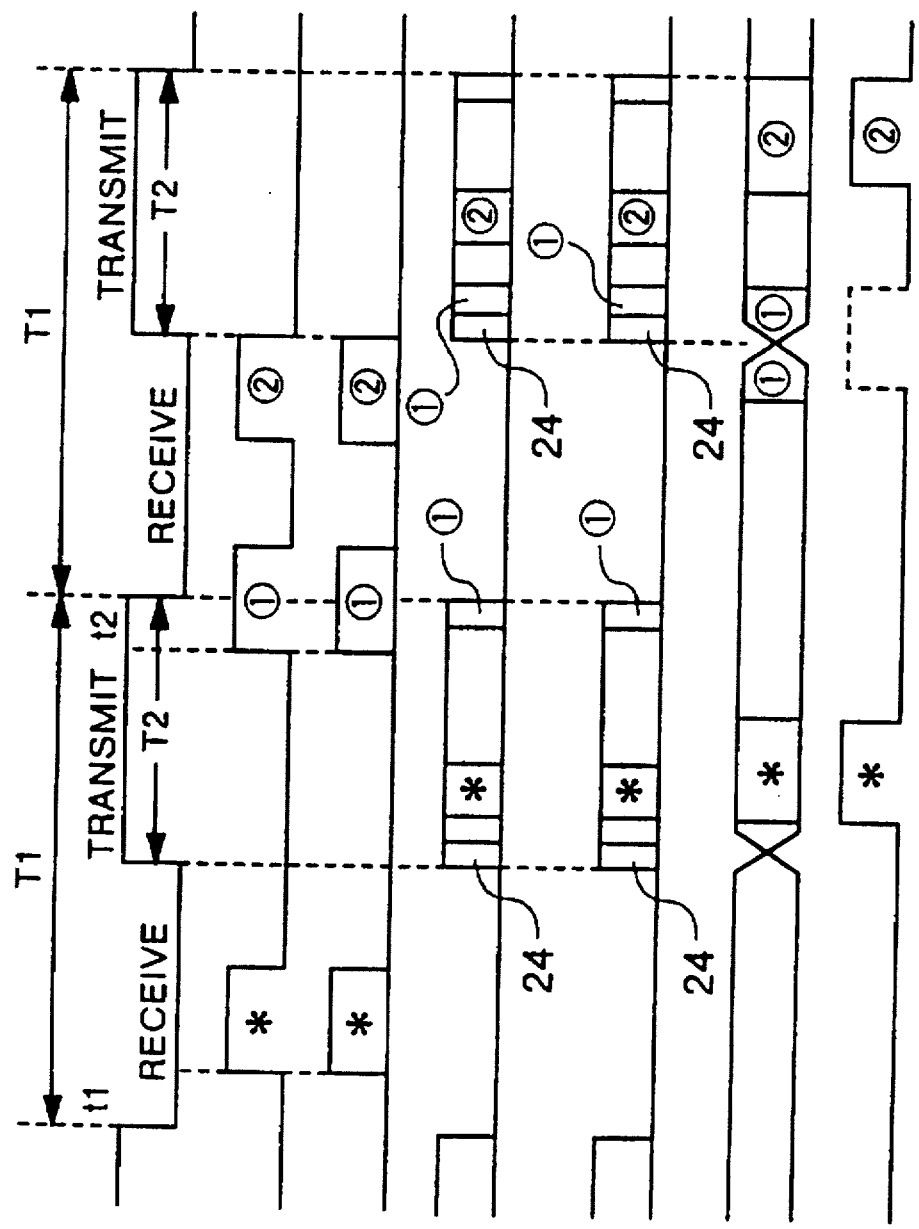
FIG. 2 shows waveforms for illustrating an operation of the transceiver of FIG. 1.

As shown in FIG. 2(a), the compressor 4 divides the speech information by a predetermined time interval T1, which is approximately 400 ms in the present embodiment. The transmission information is compressed to a time T2 which is less than half of the predetermined time interval T1 before it is transmitted. A time interval which excludes the time interval T2 allotted to the transmission from the predetermined time interval T1 is allotted to the reception. This process is repeated for each predetermined time interval T1 to alternately switch the transmission and the reception in a short time. As shown in FIG. 2(b), the DTMF keyboard 1 is operated at any timing to generate the DTMF signal.

Figures 5, 6, 7:
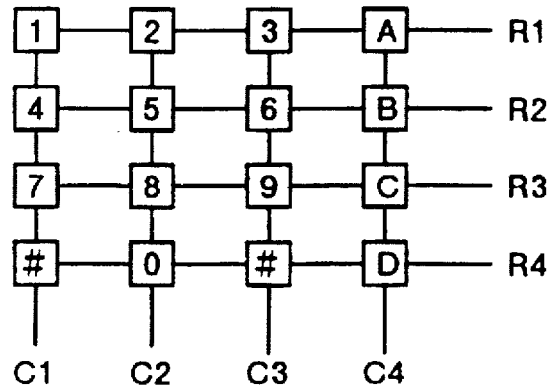
FIG. 5 shows an arrangement of a keyboard for dialing.
FIG. 6 shows a format of a signal outputted from the keyboard.
FIG. 7 shows an example of data stored in a memory.

An arrangement of the keyboard 1 for the DTMF dialing is shown in FIG. 5. The keyboard has a 4×4 matrix array of numeric keys 0–9 alphabet keys A, B, C and D, and symbol keys "*" and "#". Symbols R1, R2, R3 and R4 in row and C1, C2, C3 and C4 in column denote output signals corresponding to the key inputs. In the present embodiment, the output signal of the keyboard 1 is an 8-bit digital signal.

As shown in FIG. 6, C4, C3, C2 and C1 represent the four high order bits, and R4, R3, R2 and R1 represent the four low order bits.

In the absence of the key input, the output is of "1" (High) level, and in the presence of the key input, the output is of "0" (Low) level. In the examples of FIGS. 5 and 6, the key "6" is depressed and C3 and R2 have "0" outputs.

The DTMF encoder 2 converts the digital output signal of the keyboard 1, which is the dialing signal, to an analog signal comprising a combination of two different audio frequencies. Each row and each column of the 4×4 matrix are associated with the different audio frequencies. For the digital signal of FIG. 6, the encoder 2 generates a combined signal of the audio frequency signal corresponding to C3 and the audio frequency signal corresponding to R2.

The dialing may be conducted by depressing the "*" key, at least one numeric key and the "#" key. The "*" key indicates that a following key entry is the beginning of the telephone number. The numeric key represents the telephone number of the telephone set to be called. The "#" key indicates the end of entry of the telephone number. The dialing method in the present invention is not limited to this particular example.

As shown in FIG. 2(b), when a digital output signal 18 corresponding to the "*" key is generated from the keyboard 1 at time $t_1$, a DTMF signal 19 shown in FIG. 2(c) is generated by the DTMF encoder 2. The DTMF signal is compressed to less than half interval by the compressor 4 to produce a transmission signal 20 as shown in FIG. 2(d). The signal modulated with the transmission signal 20 by the modulator 11 is transmitted during the interval T2. A synchronization signal 24 generated by the synchronization signal generator 7 is inserted in a head portion of the transmission signal 20.

The signal is received by the base station transceiver (hereinafter referred to as "a called station). A configuration of the base station" transceiver is identical to that of FIG. 1. A reception signal 21 as shown in FIG. 2(e) is outputted from the demodulator 12 of the base station transceiver. The signal is decompressed by the decompressor 5 which outputs a decompressed received signal 22 as shown in FIG. 2(f). Since the signal has expanded to the original length, it is decoded by the DTMF decoder 8 and sent out as the decoded output (digital signal) as shown in FIG. 2(g).

Following to the input of the "*" key, the "1" key and the "2" key are entered as shown in FIG. 2(b) and the transmission signals 20 are generated in the same process as that for the "*" key. The base station transceiver generates the reception signals 21 including the DTMF signals (①) and (②)) corresponding to the "1" key and the "2" key.

The DTMF signals corresponding to the "*" key and the "2" key are transmitted without problem but since the DTMF signal corresponding to the "1" key generated at the time $t_2$ crosses over the divided predetermined time interval T1 and the following predetermined time interval T1, it is transmitted in two transmission intervals as shown in FIG. 2(d) when it is applied to the transmission audio signal compressor 4 to compress it to one half interval.

In the called station transceiver, the DTMF signal "1" is divided and received across the two intervals as shown in FIG. 2(e) and the DTMF signals expanded to the original length by the received audio signal decompressor 5 and connected together are applied to the DTMF decoder 8. The switching of the transmission and the reception is controlled by a transmission and reception switching signal 17 sent from the controller 14.

However, in the single frequency simultaneous transmission and reception radio equipment, the connected signal may not be perfectly continuous at the connected portion of the decompressed signals of the time-compressed received signals. For example, when a signal of a single frequency shown in FIG. 3(a) is compressed as shown in FIG. 3(b), received as shown in FIG. 3(c) and the decompressed signals are connected, the discontinuity of phase may appear as shown in FIG. 3(d).

Causes for the phase discontinuity are a slight difference between oscillation frequencies of crystal oscillators which determine operation speeds of the transceiver in the station sending the synchronization signal and the transceiver in the station receiving the synchronization signal, and a variation of the detection timing of the synchronization signal. The phase discontinuity Δt is in the order of several hundreds μ seconds in time. For the speech signal, such a phase discontinuity does not cause a strange feeling when is listened by human beings and no practical problem occurs. However, when the DTMF signal is to be transmitted, the DTMF signal may not be exactly received at the receiving station due to the phase discontinuity.

A second embodiment of the present invention is made in light of the above problem and it allows the exact decoding of the DTMF signal at the receiving station.

In the second embodiment, the keyboard output signal corresponding to the DTMF signal is temporarily stored in a memory, and when the transmission of the DTMF signal can be completed in the transmission time, the dialing information is immediately read from the memory and it is transmitted. If the transmission of the DTMF signal cannot be completed in the transmission time, the dialing signal stored in the memory is read in the next transmission time and the DTMF signals are transmitted in the order of reading.

Figure 4:
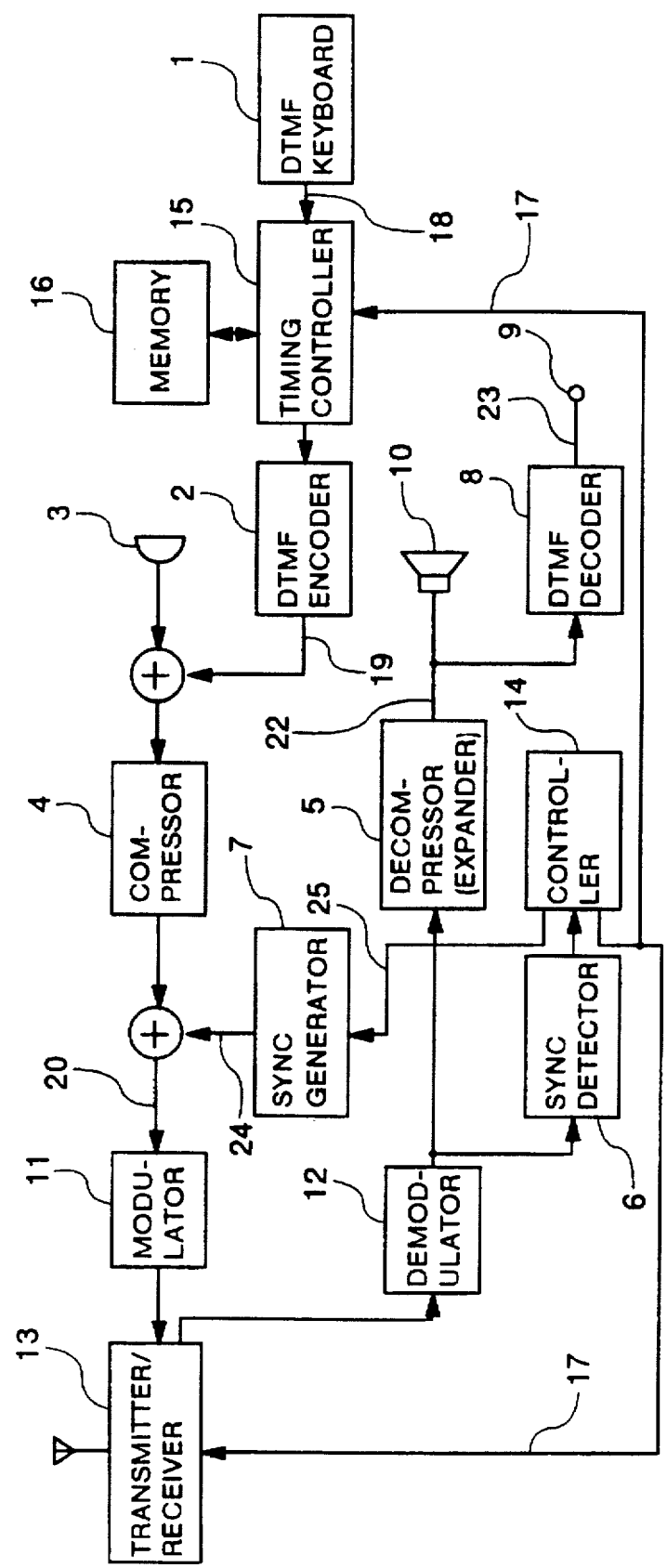
FIG. 4 shows a block diagram of a configuration of a second embodiment of the transceiver of the present invention.

FIG. 4 shows a block diagram of the transceiver of the second embodiment of the present invention. The same elements as those of FIG. 1 are designated by the same numerals and the explanation thereof is omitted. When the telephone number is dialed by the DTMF keyboard 1, the timing controller 15 controls the circuit so that the DTMF signal is outputted from the DTMF signal encoder 2 in synchronism with the repetition cycle of the transmission and the reception based on the transmission and reception switching signal 17 sent from the controller 14. The memory 16 will be described later. It is a memory for temporarily storing the output of the DTMF keyboard 1.

An operation to transmit the DTMF signal from the transceiver in the station transmitting the synchronization signal (hereinafter referred to as a calling station) is now explained. When the DTMF signal is selected by the DTMF keyboard 1, the information thereof is supplied to the timing controller 15. On the other hand, the transmission and reception switching signal 17 shown in FIG. 2(a) sent from the controller 14 is also supplied to the timing controller 15.

Since the speed and interval of the depression of the keys by the operator are not constant, the output signal 18 of the DTMF keyboard 1 is generated at a random timing. The timing controller 15 temporarily stores the digital signal generated each time the DTMF keyboard 1 is operated in the memory 16.

For example, when the "6" key is depressed, an 8-bit data "10111101" as shown in FIG. 6 is stored in the memory 16.

In an example shown in FIG. 7, the keyboard outputs are generated in the order of *, 4, 2, 3 and # and they are stored in the memory 16. As described above, each time the DTMF keyboard is operated, the data generated therefrom is sequentially stored in the memory 16 with the address being sequentially incremented and the address returns to 0 after the maximum address. In this manner, the data stored in the memory 16 is sequentially read and the read data is sequentially transmitted. The data with "1" in every bit is regarded as no data, and the data transmitted is erased from the memory 16 and all bits are set to "1".

A time required for from the depression of a key corresponding to one digit of the telephone number to the completion of the output of the corresponding DTMF signal from the encoder 2 is 20–100 ms and an interval between digits requires a similar time. In the present example, the one-digit transmission time and the interval between digits are set to 60 ms, respectively.

When the DTMF signals are sequentially transmitted, it is necessary to determine it can be completely transmitted within the predetermined time interval T1 (400 ms). Thus, the timing controller 15 determines it when the transmission and reception switching timing signal 17 is switched from the transmission to the reception. Namely, when one predetermined time interval is started, a timer is started, and if the remaining interval is 60 ms or longer when the DTMF keyboard 1 generates the output, it is determined that the transmission can be completed during the interval.

If the DTMF keyboard 1 is successively depressed at a short interval as shown in FIG. 8, The last depressed key "3" cannot be transmitted until the outputting of the previously entered digits is completed even if the remaining interval of the predetermined interval T1 is longer than 60 ms. The signal of numeral 3 in FIG. 8 indicates it. Otherwise, the phase discontinuity as shown in FIG. 3 appears. In the second embodiment, the output timing of the DTMF signal is controlled to complete the transmission of the DTMF signal within the predetermined time interval T1. To this end, in the second embodiment, each time the output of the DTMF keyboard 1 is applied to the timing controller 15, the three conditions are checked, that is, whether the remaining interval of the predetermined time interval is long enough to transmit the signal, whether the outputting of the previously depressed key is completed, and whether 60 ms or more has elapsed since the completion of the output.

If there is an enough time to complete the transmission of the DTMF signal before the end of the current predetermined time such as * in FIG. 9(c) (for example, a portion represented by the symbol T1 in FIG. 9), the digital signal stored in the memory 16 is read and it is supplied to the DTMF encoder 2. The encoder 2 generates the DTMF signal corresponding to the digital signal.

If there is not an enough time to complete the transmission of the DTMF signal before the end of the current predetermined time interval T1, the timing controller 15 delays the reading of the signal from the memory 18 until the next predetermined time interval to delay the generation of the DTMF signal from the DTMF encoder 2.

In the next predetermined time interval, the pending DTMF keyboard outputs 18 stored in the memory 18 are outputted from the DTMF encoder 2 in the order of entry. In the present example, since the "1" signal generated at the last portion of the first predetermined time interval T1 has not completed the transmission within the predetermined time interval, it is transmitted in the next predetermined time interval T1. During the predetermined time interval T1 in which the "1" signal is transmitted, the "2" DTMF signal is generated and the transmission thereof is completed in that predetermined time interval T1. Thus, the DTMF signals for "1" and "2" are transmitted in the same predetermined time interval T1 as shown in FIG. 9(c).

The timing controller 15 decides, at each time when the output signal from the keyboard 1 is received, as to whether the DTMF signal can be transmitted within the predetermined period and then control the encoder 2 to output the DTMF signal within the predetermined period as shown in FIG. 9. The timing controller 15 may control the encoder 2 to wait for next predetermined period to output the DTMF signal as shown in FIG. 10.

In the second embodiment, the presence and absence of data is sequentially checked starting from the address 0 of the memory 16 simultaneously with the start of the next predetermined time interval, and if the data is present, up to three digits are read in the ascending address order and they are sequentially transmitted with an interval of 60 ms for each digit and an interval of 60 ms between digits. A reason for the up to three digits is that since the transmission time of one digit of the DTMF signal is 60 ms and the interval between digits is 60 ms, up to three digits can be transmitted in one predetermined time interval (60×6<400). Accordingly if the signal transmission time and the interval between digits are shorter than 60 ms, respectively, the number of digits which can be transmitted in one predetermined time interval increases.

Figure 10A:
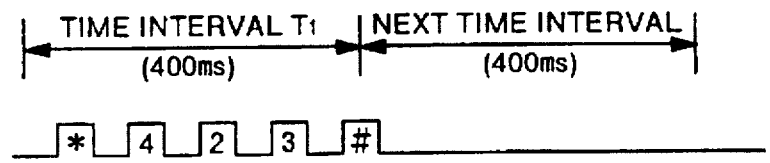
FIG. 10 shows waveforms for illustrating a relationship between an output of the keyboard and an output of the DTMF encoder.
Figure 10B:
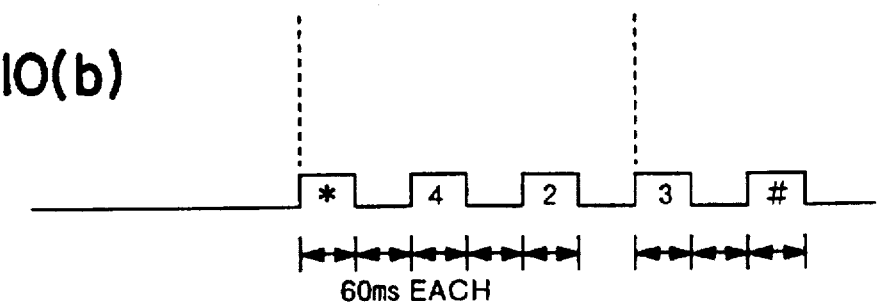

When three or more digits of pending data is stored, signal not transmitted this time is transmitted in the next predetermined interval, that is, 400 ms seconds later as shown in FIG. 10. Such an amount of delay poses no practical problem.

In this manner, the transmission of each DTMF signal is always completed in one transmission interval and it is not transmitted across two transmission intervals which may occur in the first embodiment.

Figure 12:
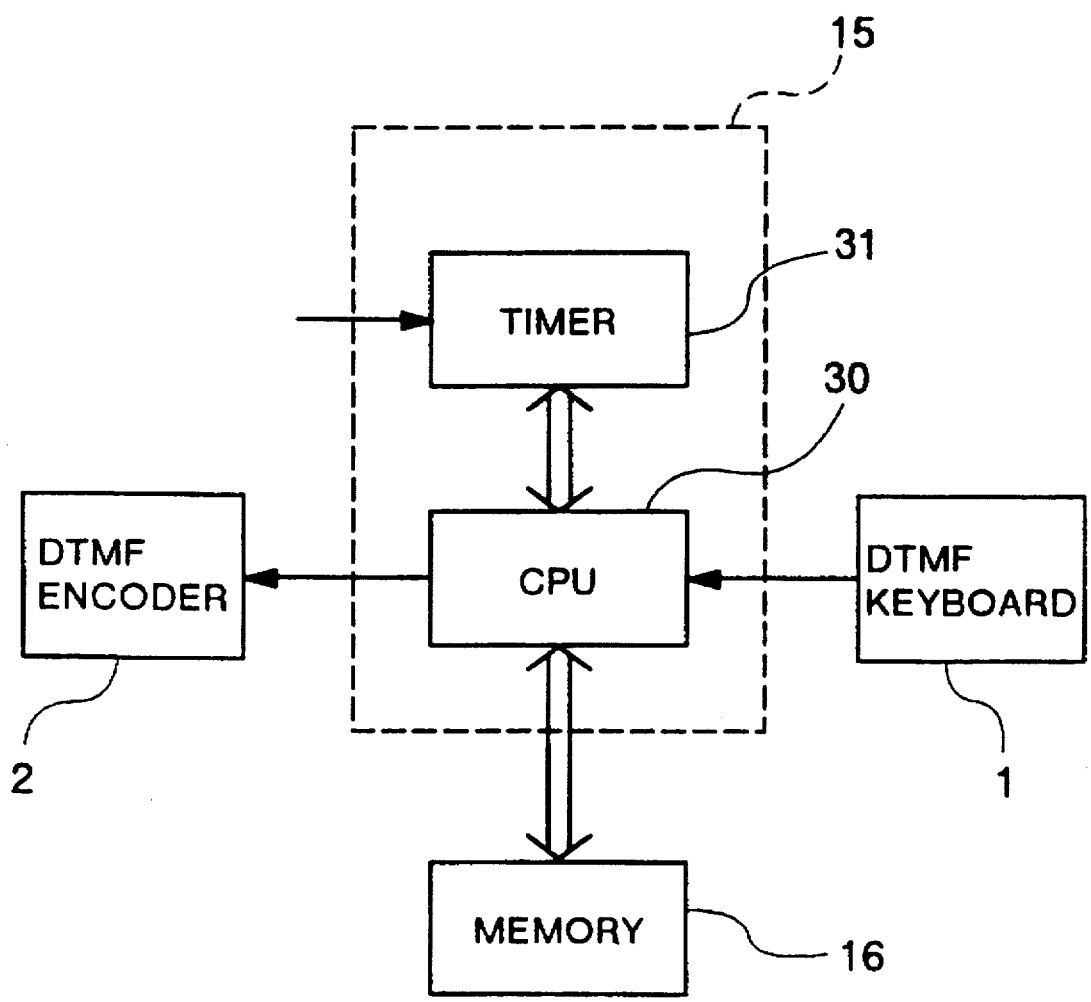
FIG. 12 shows a specific block diagram of a timing control unit of the transceiver of FIG. 4.
Figure 13A:
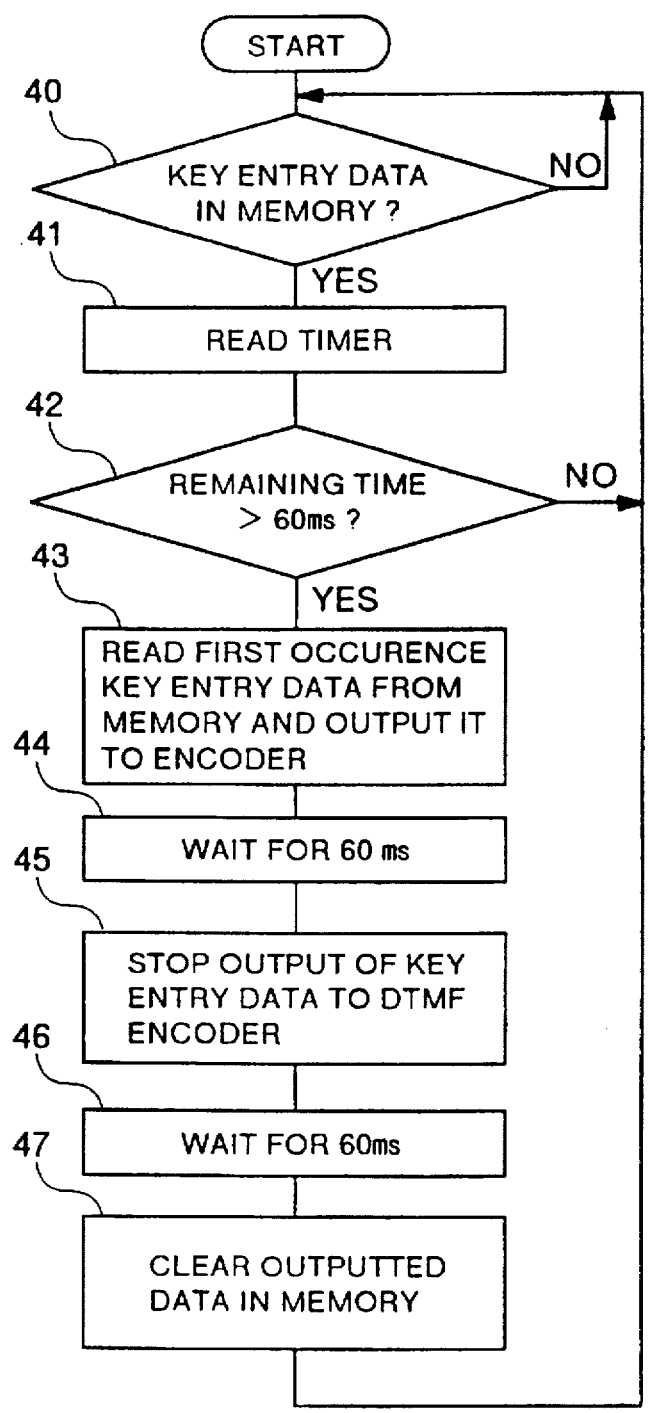
FIG. 13A shows an operation flow chart of a main process by the timing control unit of FIG. 12.

FIG. 12 shows a block diagram of a specific configuration of the timing controller 15 of the second embodiment. The timing controller 15 comprises a CPU 30 and a timer circuit 31. The CPU 30 operates in accordance with a program which executes flow charts of FIGS. 13A and 13B. FIG. 13A shows a flow of a main process of the DTMF signal generation timing and FIG. 13B shows a flow of an interruption process.

In step 40 of FIG. 13A, whether key input data is present in the memory or not is determined. If the data is present, a count of the timer 31 is read in step 41. The timer 31 is cleared to 0 at a transition point from the transmission to the reception of the transmission and reception switching signal 17 and incremented thereafter. In step 42, a remaining time of the current predetermined time interval T1, that is, 400 ms of timer count is calculated, and whether the remaining time is equal to or longer than 60 ms or not is determined. If the remaining time is equal to 60 ms or longer, the first key entry data is read from the memory 16 in step 43 and it is outputted to the encoder 2. Then, the encoder 2 starts to output the DTMF signal. In step 44, the process waits for 60 ms. During this period, the DTMF signals are continuously outputted. In step 45, the data entry to the encoder 2 is stopped. Then, no DTMF signal is outputted. In step 46, the process waits for 60 ms for keeping a blank period until the output of next DTMF signal. In step 47, the data outputted is cleared from the memory 16.

Figure 13B:
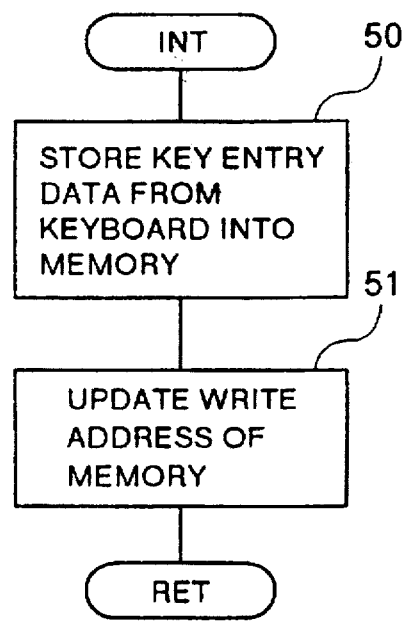
FIG. 13B shows an operational flow chart of an interruption process by the timing control unit of FIG. 12.

Each time the data output from the keyboard 1 is applied to the timing controller, the interruption process shown in FIG. 13B is executed. In step 50, the output data from the keyboard 1 is stored in the memory 16. In step 51, the write address of the memory 16 is updated.

As described above, in accordance with the present invention, the communication between the transceiver and the telephone set is enabled by adopting the DTMF signal in the single frequency simultaneous transmission and reception radio communication system. Further, the dial data generated by the DTMF signal keyboard is temporarily stored in the memory, and whether the transmission of the DTMF signal in the predetermined interval can be completed or not is determined, and if it can, the data is read from the memory and the DTMF signal is transmitted. Thus, the DTMF signal does not cross two adjacent transmission intervals and the exact reproduction of the DTMF signal is attained.

What is claimed is:

1. In a transceiver for transmitting a speech signal by dividing the speech signal by a predetermined time interval and time-compressing transmission information into each of the divided intervals and allotting a remaining interval of the predetermined time interval caused by the time compression to the reception, and repeating the above process to attain the simultaneous transmission and reception by using a single frequency for the transmission and reception, a method for transmitting a DTMF signal of the single frequency simultaneous transmission and reception radio communication system comprising the steps of:

storing selection information of the DTMF signal in a memory;

immediately reading out the DTMF signal selection signal and transmitting the DTMF signal when the selected DTMF signal is at a timing to complete the transmission within the compressed transmission time in the predetermined time interval; and reading out the DTMF signal selection information stored in the memory in the compressed transmission time of the next predetermined time interval and transmitting the read DTMF signals in sequence when the transmission cannot be completed within the compressed transmission time of the current predetermined time interval.

2. A radio communication method in which a continuous audio signal is divided into a plurality of predetermined time intervals, each predetermined time interval being time-compressed to less than half of a predetermined time interval, with a transmission time and a reception time being allotted in each of the predetermined time intervals, wherein, in each predetermined time interval, the time-compressed signal is transmitted during the transmission time and a time-compressed signal transmitted from another transceiver is received in the reception time and decompressed to original length, said transmission time and reception time being alternately repeated to transmit and receive said time-compressed signals essentially simultaneously by a single carrier frequency, with an audio signal being reproduced from the received and decompressed signal, said method comprising the steps of:

generating a DTMF signal as a dialing signal to call a telephone set from a transceiver when communication is to be made with the telephone set; and time-compressing the DTMF signal and transmitting the time-compressed DTMF signal along with the time-compressed audio signal, wherein said step of time-compressing the DTMF signal includes a step of controlling a transmission timing of the DTMF signal such that the transmission of the DTMF signal is completed before the transmission time is switched to the reception time.

3. A radio communication method in which a continuous audio signal is divided into a plurality of predetermined time intervals, each predetermined time interval being time-compressed to less than half of a predetermined time interval, with a transmission time and a reception time being allotted in each of the predetermined time intervals, wherein, in each predetermined time interval, the time-compressed signal is transmitted during the transmission time and a time-compressed signal transmitted from another transceiver is received in the reception time and decompressed to original length, said transmission time and reception time being alternately repeated to transmit and receive said time-compressed signals essentially simultaneously by single carrier frequency, with an audio signal being reproduced from the received and decompressed signal, said method comprising the steps of:

generating a DTMF signal as a dialing signal to call a telephone set from a transceiver when communication is to be made with the telephone set; and time-compressing the DTMF signal and transmitting the time-compressed DTMF signal along with the time-compressed audio signal, wherein said step of controlling the transmission timing of the DTMF signal includes a step of storing information representing the DTMF signal entered in the transceiver, a step of determining whether the transmission of the DTMF signal can be completed before the switching of the transmission time to the reception time, and a step of reading the information representing the DTMF signal from the memory and transmitting it as the DTMF signal when the determination indicate that the transmission can be completed.

4. A transceiver for transmitting and receiving signals, wherein a continuous audio signal is divided into predetermined time intervals with each of the divided predetermined time intervals being time-compressed to less than half of the predetermined time interval, to produce a time-compressed signal, and with a transmission time and a reception time being allotted in each of the predetermined time intervals, the time-compressed signal being transmitted during the transmission time and a time-compressed signal transmitted from another transceiver being received in the reception time and then decompressed to an original length, the transmission time and the reception time being alternately repeated to transmit and receive audio signals substantially simultaneously by a single carrier frequency, said transceiver comprising:

DTMF signal generation means for generating as a dialing signal a DTMF signal for calling a telephone set before voice communication is to be made with the telephone set;

means for time-compressing the DTMF signal to an interval less than half of the predetermined interval;

means for modulating a carrier with the time-compressed DTMF signal, adding a synchronization signal thereto, and transmitting the modulated carrier and synchronization signal during the transmission time;

means for detecting the signal received in the reception time to detect the time-compressed DTMF signal and the synchronization signal; and means for time-decompressing the time-compressed DTMF signal to reproduce the original DTMF signal.

5. A transceiver according to claim 4, further comprising:

means for controlling a transmission timing of the DTMF signal such that the transmission of the DTMF signal is completed before the transmission time is switched to the reception time.

6. A transceiver according to claim 5 wherein said means for controlling the transmission timing of the DTMF signal includes a memory for storing the generated DTMF signal and control means for determining whether the transmission of the DTMF signal can be completed before the transmission time is switched to the reception time and reading out the DTMF signal from the memory and transmitting the DTMF signal when the determination indicate that the transmission can be completed.

7. A transceiver according to claim 6 wherein said DTMF signal generation means includes a keyboard for outputting information representing the DTMF signal corresponding to a telephone number in response to the input of the telephone number assigned to the telephone set and an encoder for generating the DTMF signal comprising a combination of a plurality of different audio frequency signals in response to the output information of the keyboard, and said means for reproducing the original audio signal includes a decoder for converting the reproduced DTMF signal to information representing the DTMF signal.

8. A radio communication method in which an audio signal is divided into a plurality of audio signal segments each a predetermined time interval in length, each of said segments being time compressed to a length less than half of a predetermined time interval, wherein the predetermined time interval in which each segment resides is partitioned into a transmission time and a reception time, with the time-compressed segment in each predetermined time interval being transmitted during the transmission time and a time-compressed signal transmitted from another transceiver being received during the reception time of each predetermined time interval and then being decompressed to original length, said transmission time and reception time in each predetermined time interval being alternately repeated to transmit and receive said time-compressed signals essentially simultaneously by single carrier frequency, with an audio signal being reproduced from the decompressed signal derived from each predetermined time interval, said method comprising the steps of:

generating a DTMF signal as a dialing signal to call a telephone set from a transceiver when communication is to be made with the telephone set; and time-compressing the DTMF signal and transmitting the DTMF signal along with the time-compressed audio signal, wherein said step of time-compressing the DTMF signal includes a step of controlling a transmission timing of the DTMF signal such that the transmission of the DTMF signal is completed before the transmission time is switched to the reception time.

9. A radio communication method in which an audio signal is divided into a plurality of audio signal segments each a predetermined time interval in length, each of said segments being time compressed to a length less than half of a predetermined time interval, wherein the predetermined time interval in which each segment resides is partitioned into a transmission time and a reception time, with the time-compressed segment in each predetermined time interval being transmitted during the transmission time and a time-compressed signal transmitted from another transceiver being received during the reception time of each predetermined time interval and then being decompressed to original length, said transmission time and reception time in each predetermined time interval being alternately repeated to transmit and receive said time-compressed signals essentially simultaneously by single carrier frequency, with an audio signal being reproduced from the decompressed signal derived from each predetermined time interval, said method comprising the steps of:

generating a DTMF signal as a dialing signal to call a telephone set from a transceiver when communication is to be made with the telephone set; and time-compressing the DTMF signal and transmitting it along with the time-compressed audio signal, wherein said step of controlling the transmission timing of the DTMF signal includes a step of storing information representing the DTMF signal entered in the transceiver, a step of determining whether the transmission of the DTMF signal can be completed before the switching of the transmission time to the reception time, and a step of reading the information representing the DTMF signal from the memory and transmitting it as the DTMF signal when the determination indicate that the transmission can be completed.

* * * * *